United States Patent

[11] 3,617,839

| [72] | Inventor | Arthur Hill<br>North Olmsted, Ohio |
|---|---|---|
| [21] | Appl. No. | 881,085 |
| [22] | Filed | Dec. 1, 1969 |
| [45] | Patented | Nov. 2, 1971 |
| [73] | Assignee | Lear-Siegler, Inc.<br>Maple Heights, Ohio |

[54] BRUSHLESS MOTOR AND INVERTER
7 Claims, 4 Drawing Figs.

| [52] | U.S. Cl. | 318/225,<br>318/138, 318/227, 317/16 |
|---|---|---|
| [51] | Int. Cl. | H02p 5/40 |
| [50] | Field of Search | 317/16;<br>318/138, 225, 227 |

[56] References Cited
UNITED STATES PATENTS

| 3,364,408 | 1/1968 | Katz et al. | 318/138 |
| 3,416,055 | 12/1968 | Toth | 318/138 |
| 3,475,653 | 10/1969 | Odenberg et al. | 317/16 |
| 3,509,438 | 4/1970 | Kachuk | 318/138 |

*Primary Examiner*—Gene Z. Rubinson
*Attorney*—Oberlin, Maky, Donnelly & Renner

ABSTRACT: A control system and power supply for energizing a single-phase AC motor from a DC source for critical brush wear applications utilizing a solid-state inverter circuit and an auxiliary start winding for the motor continuously energized through a capacitor connection. An automatic shutdown feature for the motor-inverter combination is included for loss of fluid heat sink in fluid environments comprising a temperature responsive sensing element, an SCR trigger device and a power interrupter activated thereby.

PATENTED NOV 2 1971        3,617,839
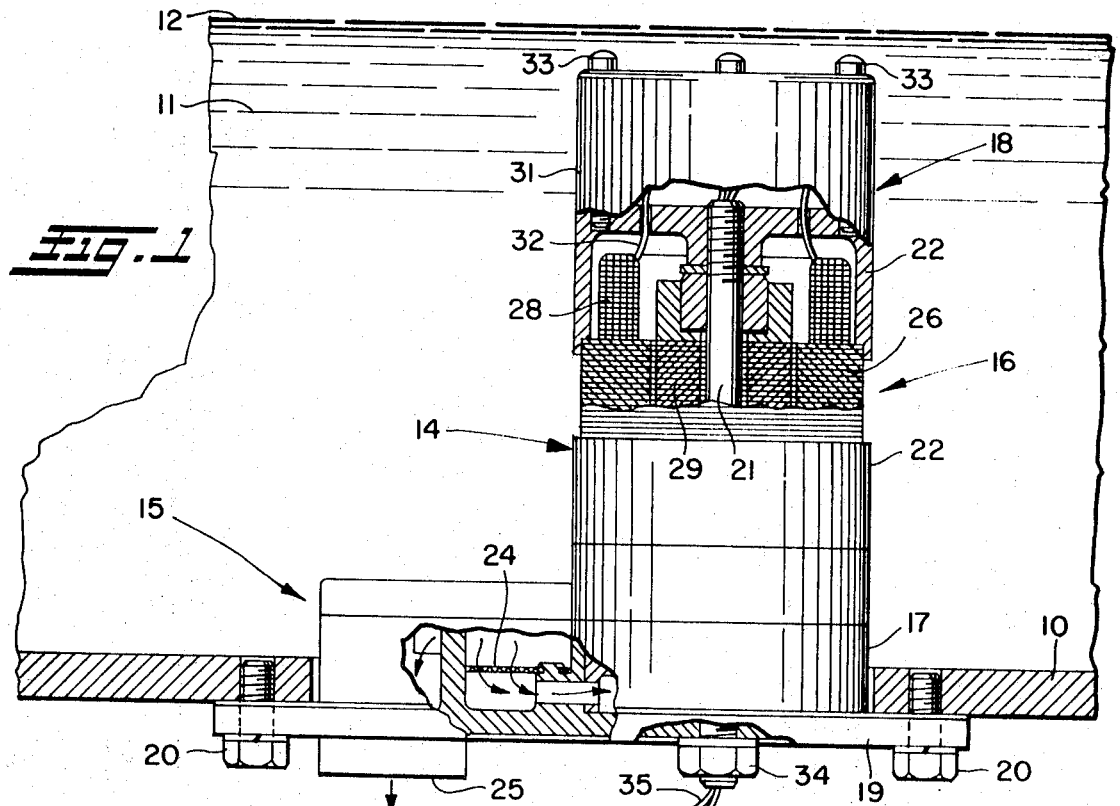
INVENTOR.
ARTHUR HILL
BY
Oberlin, Maky, Donnelly & Renner
ATTORNEYS

BRUSHLESS MOTOR AND INVERTER

This invention relates to electric motors and more particularly to AC motors energized from DC power source to form a brushless DC motor especially for application as a wet boost pump and in similar environments wherein package miniaturization is essential.

While it is not new to merely combine an AC motor with an AC signal generator to form a brushless DC motor, prior art devices are deficient in requiring bulky packages and complex circuits and have been prohibitive in cost. The essential problem in an AC motor is the requirement for producing rotating magnetic fields in the motor so as to effect movement of the rotor structure. In the past, two- and three-phase arrangements have been used to a great extent to produce relative movement of the field and such units have found limited acceptance in many applications. Obviously, however, multiple windings or intricate switching arrangements are necessary in configurations of this type and, as a result of the prohibitive costs in these systems, have only been utilized in applications where brush wear problems could not be tolerated or the additional cost could be justified.

In fields of endeavor where it is desired to utilize a brushless motor, such prior art devices are eminently impractical. One such particular field is that of the wet boost pump application wherein the pump and motor are submerged in the fluid and are not readily accessible for servicing. Further, volatile fluids are often used in these environments and the disadvantage of the typical commutator for a DC motor is obvious. Still further, the size of the motor and pump package is critical as displacing a portion of the fluid and the bulk of the prior art systems cannot be tolerated.

However, the wet boost pump application provides a unique advantage in that the fluid can act as a coolant for the motor and pump combination and allows a degree of package miniaturization. There is a need in this field for a simplified form of brushless DC motor wherein feasibility and reliability are inherent in the system and problems such as bulk and cost are reduced to a minimum. It is also especially advantageous in the wet boost pump application that cooperation with the fluid medium can be relied upon for partial control of the power supply circuitry other than the convenience afforded by the provision of a readily available heat sink. Thus, provision can be made for electrically sensing when the fluid level has dropped to a minimum level and whereat it is desired to remove power from the motor and pump combination to prevent overheating of same.

The brushless motor of this invention comprises a conventional single-phase AC motor having a main winding in connection with a phase displacement capacitor and starting winding and does not require the conventional mechanical switching for starting and running conditions. The starting winding and the capacitor are connected in series with one another and parallel the main winding of the motor which in turn is center tapped to receive energization from a conventional inverter circuit of solid state design. A heat-responsive disabling circuit is utilized in conjunction with the inverter, relying on the elevation in temperature of the motor or inverter package or a discrete element therein, to reduce or interrupt voltage applied to the inverter circuit. Such condition normally occurs upon lowering of the fluid level in the boost tank and thus removal of the heat sink for the package. Alternatively, it could occur upon malfunction of the motor or pump combination or one of the components in the inverter circuit which could cause abnormal operation and attendant heat rise of the package.

Therefore, it is one object of this invention to provide an improved brushless DC motor of simple construction, reliable design and minimal cost.

It is another object of this invention to provide a brushless DC motor comprising a simple AC motor and solid state inverter combination which only requires the application of single-phase power to the motor.

It is yet another object of this invention to provide an improved brushless motor utilizing a single-phase AC motor which employs an auxiliary winding and phase shift element continuously connected across the main winding of the motor thereby improving starting capabilities of the motor and effecting a power factor improvement which results in a reduction in the DC input current level.

It is still another object of this invention to provide a brushless motor package especially suitable for wet boost pump applications wherein the fluid medium is relied upon as a heat sink to allow package miniaturization and to provide a means for switching of power to the motor.

It is a still further object of this invention to provide a control circuit for an oscillator of the inverter type in a wet boost pump application which relies on the temperature rise of a heat-generating element to effect switching of the circuit between operative and inoperative states.

Referring now to the drawings:

FIG. 1 is an elevational view, partly in cross section, of the apparatus of the invention shown in a typical environment, comprising a fuel tank with fuel at a particular level therein;

FIG. 2 is an electrical schematic diagram partly in block diagram form showing one circuit for protecting the motor-inverter combination under low fluid level conditions;

FIG. 3 is an electrical schematic diagram partly in block diagram form showing yet another version of circuitry for protecting the motor-inverter combination from overheating under low fluid level conditions; and FIG. 4 is an electrical schematic diagram of the motor-inverter combination which forms the preferred embodiment of this invention.

Referring now to FIG. 1, there is shown a portion of tank 10 containing fuel 11 therein at a particular level indicated at 12 which forms the typical environment for the apparatus of this invention. The tank 10 may be a conventional fuel tank containing volatile fluid wherein it is desired to pump the fluid under pressure to a remote utilization device. In this showing of the invention, the pump apparatus 14 is completely submerged in the fluid 11 and comprises essentially a pump section 15, a motor 16 and a power package 18 assembled as a complete unit for mounting in the lower portion of the tank 10.

The pump apparatus 14 may be of the type shown in the copending application of Melvin F. Huber, U.S. application Ser. No. 842,293, filed July 16, 1969, but it will be understood that other types of pump apparatus may be used if desired without departing from the scope of the present invention. As shown, the pump section 15 is formed in part by cylindrical housing 17 and base plate 19, being sealingly mounted in an aperture in the lower wall of the fuel tank 10 by means of bolts 20. A shaft 21 passing through and generally perpendicular to the base plate 19, supports portions of the pump 15 which in turn receives the fluid 11 at an inlet port 24 for discharge under pressure from an outlet port 25.

Mounted on the pump 15 by means of mating flanged housings is the motor section 16 comprising end bells 22 supporting a stator assembly 26 which is the usual annular iron assembly wound with the main and auxiliary windings 28 of a single-phase motor. Rotatably mounted on the shaft 21, which extends through the motor section 16 and into the power package 18 being threaded into the upper end bell 22, is the rotor structure 29 which is a generally cylindrical iron member of the usual single-phase induction motor. The lower portion of the rotor 29 is connected in any suitable manner with the impeller of the pump 15, so that rotation of the motor 29, under influence of the magnetic fields generated in the stator 26, causes discharge of fluid from the outlet port 25.

Mounted in turn on the motor section 16 is the power package 18, being contained in a cylindrical housing 31 having a closed upper end and secured by bolts 33 to the upper end bell 22 of the motor section 16. The housing 31 contains the oscillator or inverter circuitry for energizing the motor and electrical connection is made to the motor windings 28 via lead wires 32, passing through upper end bell 22, suitable provision being made for sealing the housing 31 from the entry of the fluid. The shaft 21 passing through the pump assembly 15 and the motor section 16 is of tubular configuration and is secured at the lower end by retaining nut 34 to provide a conduit for application of power to the power package 18 from an external source of supply as by the cable 35. The shaft 21 may also be sealed to prevent the entrance of contaminants into the upper housing 31.

It will be appreciated that the pump, motor and power package assembly 14 comprises but a small volume of the total tank 10 volume and is situated at the bottom portion thereof so that in normal operation the complete assembly 14 is fully submerged until the last remaining portion of fluid 11 to be pumped is reached. Further, it will be appreciated that the total volume of fluid in the tank 10 is so much greater than the volume of the assembly 14 therein as to act as a very efficient heat sink, accepting heat from the assembly 14 and transmitting same to the walls of the tank 10 by conventional conduction.

Referring now to FIG. 2, there is shown in electrical schematic form a first embodiment of this invention wherein means are provided for protecting the power package 18 and motor 16 from excessive heat conditions when the fluid level in the tank 10 falls low enough to expose the assembly 14. The embodiments depicted in FIGS. 2 and 3 are related to the FIG. 1 showing by the grouping of the electrical components wherein the components located within the dashed box 36 correspond essentially to the power package 18 while the components located in the dashed box 38 relate to the motor section 16. Power is supplied from a DC source 39 through an on-off switch 40 to the components in the power package 36. As indicated, the positive line 41 from the power supply 39 is connected in series with a voltage-limiting element, in this case resistor 42, which in turn is connected to an oscillator circuit 44 by connecting line 45. The oscillator circuit 44 may comprise any suitable form of oscillator for converting the applied DC voltage to a single-phase AC output on lines 46 for application to the motor section 38, and as will be detailed hereinafter preferably comprises an inverter circuit utilizing a pair of transistors for alternate switching the DC potential. The negative side of the DC source 39 is connected by way of line 48 as a second input for the oscillator circuit 44 and in practice the negative line 48 can comprise a ground connection for the circuitry, the electrical contact being made through the metallic conductive housings of the pump 15, motor 16 and power packages 18.

Connected across the input of the oscillator circuit 44 is an SCR 49 (silicon controlled rectifier), having its anode connected to line 45 and its cathode connected to negative line 48. A temperature-sensing element, preferably a thermistor 50 is connected at one end to the anode of SCR 49 and at the other to the gate electrode of SCR 49. A bias resistor 51 of fixed value is connected between the gate electrode and cathode electrode of the SCR 49.

Under normal operating conditions heat-generating resistor 42 is selected to provide minimal heat output when the oscillator 44 is supplying power to the motor section 38 and when sufficient fluid 11 is contained within the tank 10 to completely submerge the apparatus 14. In this condition, temperature rise above a predetermined temperature level is prevented, this being an ambient temperature level wherein excess heat is transmitted through the housing 31 of the power package 18 to the fluid medium 11 and dissipated by the heat sink. The thermistor 50 is located close to the heating resistor 42 to monitor the temperature level of same and acts in cooperation with the fixed resistor 51 to hold the gate level of the SCR 49 in an untriggered condition. As such, the SCR 49 acts as a high-impedance device presenting practically no additional load to the DC power source 39 by way of the heat generating resistor 42.

When, however, fluid 11 in the tank 10 falls sufficiently to expose a portion of the assembly 14 or becomes insufficient in volume to adequately dissipate the heat generated in the apparatus 14, the temperature level of the apparatus 14 and in particular the heat-generating resistor 42 will begin to rise, causing a reduction in impedance of the thermistor 50 due to its negative temperature coefficient, thereby raising the potential applied to the gate electrode of the SCR 49. At any preset level, determined by the selection of the values of the resistor 51, thermistor 50, SCR 49 and proximity of the thermistor 50 to the resistor 42, triggering of the SCR 49 will occur and a substantial short circuit will be effected across the input of the oscillator 44. This action will interrupt voltage to and prevent further operation of the oscillator 44 and thus prevent the application of full voltage to the motor section 38 thereby avoiding damage to components both in the motor and in the oscillator. Such damage could occur due to the temperature variations in parameters of the semiconductor components or the heat rise effects upon the mechanical components in the pump 15 or motor 16. DC power will continue to flow from the source 39 through the heat generating resistor 42 and the now conductive SCR 49 which will be maintained in a conducting condition even though gate voltage has dropped to an extremely low level. Accordingly, heat-generating resistor 42 is selected to have an impedance value sufficiently small so as not to effect normal operation of the oscillator 44 when in the operating state and sufficiently large so as not to dissipate excessive power when the SCR 49 has been triggered to conduction.

The circuit will remain in this condition with SCR 49 conducting so long as a complete circuit from the DC power source 39 is effected. Interruption of current flow, however, as by opening of switch 40 will cause resetting of the SCR 49 and a return of the circuit to the normal operating condition whereby DC power is applied to the oscillator 44, dependent, of course, upon thermistor 50 sensing a proper operating temperature level.

FIG. 3 represents another embodiment of the invention wherein a different circuit arrangement is utilized for removing excess power from the total power package 36 and motor 38 upon excessive heat rise. Again, DC power is applied from a source 39 by way of an on-off switch 40 and now a resettable circuit breaker 52 directly to the oscillator circuit 44 via line 54. The circuit breaker 52 can be selected to have a rating to allow normal operation of the oscillator 44, but to be switched to an open circuit condition upon excessive current flow due, for example, to failure of a component in the oscillator 44 or the triggering of the heat protection circuit. Such latter circuit comprises again an SCR 55 connected across the input of the oscillator 44 in parallel with a series thermistor 56 and bias resistor 58 whose junction 59 is connected to supply triggering potential to the gate electrode of the SCR 55. In this embodiment of the invention the thermistor 56 may be located near any component of the oscillator 44 or motor 38 which would be expected to experience a heat rise upon absence of the fluid heat sink or may be located in close association with the housing 31 of the power package 18 in a convenient location. In any event, upon experiencing a rise in temperature level, the thermistor 56 will decrease sufficiently in impedance to raise the gate electrode of the SCR 55 to the triggering level and cause conduction of the SCR 55. Such conduction, while temporarily shorting the input terminals of the oscillator 44 to prevent further operation thereof, will also conduct excessive current flow through the circuit breaker 52 causing its activation to an open circuit condition, thereby entirely removing power from the power package 36. Reestablishment of the circuit then is accomplished by resetting the circuit breaker 52 to the closed condition and if the temperature level of the apparatus 16 is within the proper operating range, the connection will apply normal power to the oscillator circuit 44.

It will be appreciated that components other than the SCR's 49, 55 can be employed both in the FIG. 2 and FIG. 3 embodiments of the invention such as for example a transistor whose conduction is varied by the change in impedance of the thermistors 50, 56, however, the abrupt triggering characteristics of the SCR as well as the relatively low forward impedance at conduction and the extremely high back impedance at cutoff are desirable in this environment.

Referring now to FIG. 4, there is shown the preferred embodiment of this invention describing in greater detail the components comprising the oscillator or inverter circuit 44 which supplies the AC power to the motor 38 to effect operation on a single-phase basis. A DC source 39 is again indicated having polarity as marked, being connected to supply power to the inverter 44 by way of a temperature-disabling circuit indicated by block 60, this being a substantially continuous connection under normal operating conditions as described with reference to FIGS. 2 and 3 and indicated by the dashed lines 61, 62.

The inverter circuit 44 is substantially conventional configuration comprising transistors 64, 65 of PNP configuration having base electrodes connected to the positive potential line 66 and collector electrodes connected to either side of a transformer winding 68. Feedback windings 69, 70 of the transformer, and magnetically coupled to the winding 68, are connected respectively at one end to the positive potential line 66 and at the other to the base electrodes of the transistors 64, 65 by way of current-limiting resistors 71, 72. Resistor 72 is additionally connected at one end to the center tap 74 of the main winding 68 of the transformer. Additionally, diodes 75, 76 are connected across the collector-emitter electrodes of the transistors 64, 65 in the polarity indicated to prevent excessive voltage surges from damaging the transistors. Current return to the power supply 39 is effected via the connection of negative line 78 to the center tap 74 of winding 68.

Thus, in normal operation initial conduction will occur through transistor 65 due to the base bias set up by the connection to the tap 74 of the transformer to effect current flow through the right half of the main winding 68 of the transformer. As is well known in this art, upon saturation of the core of the transformer and reversal in the voltage, the mutually coupled windings 69, 70 will receive voltages of opposite polarities causing transistor 64 to become conductive and transistor 65 to be cut off, thereby causing current flow through the collector of transistor 64 and the left half of the main winding 68 of the transformer. Such action will alternate causing oscillation at a frequency determined by the transformer and component design and the load coupled thereto and may be selected to provide any desired frequency of operation especially suited to the motor design which may vary as to the number of poles or the frequency desired.

In this invention the load is the motor section 38 and comprises the impedance effected by the parallel connection of the main winding 80 of the AC motor with the series connection of the auxiliary starting winding 81 and fixed condenser 82. As indicated, connection to the inverter 44 is made by the lines 84, 85 connecting either end of the main winding 80 to the collector electrodes of the transistors 64, 65 together with the connection of the center tap 86 of the main winding 80 to the negative line 78 of the DC power source 39.

The unique motor winding and capacitor connection provides several advantages, particularly in the flooded application described herein wherein space and reliability are at a premium. By virtue of the continuous connection of the capacitor 82 and starting winding 81 in parallel with the main winding 80, it will be appreciated that charging and discharging of the capacitor 82 will occur as the substantially square wave output of the inverter 44 is applied to the motor. A leading current will be developed in the starting winding 81 with respect to that in the main winding 80 and an effective electrical field pole rotation will occur to impart rotation to the rotor 29 of the motor section 16. As is well understood in this art, the use of the capacitor 82 will enhance the starting torque of the motor and since the capacitor remains in the circuit, the need for mechanical switching is eliminated.

Further, during continued operation of the motor, a reduction in the DC input current to the inverter 44 will be achieved by the improvement in the motor power factor due to the leading current in the winding 81 affecting the total impedance of the motor. By selection of an appropriate value of capacitor 82, which should be of the nonpolarized type, an optimum condition can be obtained for both starting and running conditions, or one or the other can be emphasized for specific motor load requirements.

Although a preferred embodiment of this invention has been depicted, it will be obvious that many variations in circuit components or configurations can be made. Thus, for example, various forms of inverter circuits can be utilized including NPN transistor configurations to provide the minimal package size indicated while achieving the advantage of a brushless DC motor arrangement. While especially suited for the wet pump application, the invention is applicable to many other environments where size considerations, protection against overheating and reliable performance are of importance.

I, therefore, particularly point out and distinctly claim as my invention:

1. Apparatus for energization and protection of an AC motor from a DC source of power, comprising in combination with said AC motor, an oscillator for converting the DC power applied at the input to AC for application to said motor, means connected at the input of said oscillator for limiting the DC power to a level to prevent oscillation upon energization of said limiting means, means for energizing said limiting means in response to a control signal, and heat-responsive means for developing such control signal at a predetermined temperature level.

2. Apparatus as set forth in claim 1 wherein said energizing means comprises an SCR in shunt connection at the input of said oscillator and said heat-responsive means comprises a thermistor in operative connection with the gate electrode of said SCR for controlling gating current.

3. Apparatus as set forth in claim 2 wherein said motor, said oscillator and said thermistor are contained in a fluidtight housing for operation in a fluid environment, said thermistor being operative to sense elevation in temperature of said housing to a predetermined level due to lowering of fluid level to expose said housing, for gating said SCR into conduction.

4. Apparatus as set forth in claim 3 wherein said limiting means comprises a resistor in said housing in series connection with said source of power and said oscillator, said resistor being adjacent said thermistor and adapted to supply heat thereto as a function of the temperature of said housing.

5. Motor drive apparatus for a wet boost pump, comprising a source of DC power, a motor having main and starting windings in parallel connection on the stator structure thereof for imparting rotation to a rotor member, said main winding having a center tap thereon, a capacitor in series connection with said starting winding, a magnetic core transformer having a main winding with center tap, said transformer main winding being in parallel connection with said motor main winding with said center taps being connected in common to said power source, a pair of transistors having collectors connected to either end of said transformer main winding, said pair of transistors being switching elements for alternately applying the DC voltage of said power source to said transformer to generate an AC voltage, further windings on said transformer connected to said pair of transistors for controlling the alternate switching thereof, means in series connection with said source of power for materially reducing the voltage upon energization thereof, an SCR in shunt connection with said reducing means for energization of the latter, and a temperature-sensitive element for triggering said SCR to a conductive condition upon attaining a predetermined temperature level, thereby to prevent alternation of said pair of transistors.

6. The apparatus as set forth in claim 5 wherein said reducing means comprises a fixed resistor in series connection between the power source and said pair of transistors said temperature sensitive element being responsive to the heat dissipated by said resistor to control triggering of said SCR.

7. The apparatus as set forth in claim 5 wherein said reducing means is a circuit breaker having a rating sufficient to protect said pair of transistors in normal operation and to be energized to an open circuit condition upon excessive current flow through said SCR.